United States Patent
Kuhlman

[15] 3,637,401
[45] Jan. 25, 1972

[54] HYDROSTATIC FRYING METHOD

[72] Inventor: Walter F. Kuhlman, Norwalk, Ohio
[73] Assignee: The Roto Corporation, Norwalk, Ohio
[22] Filed: July 28, 1970
[21] Appl. No.: 58,821

Related U.S. Application Data

[63] Continuation of Ser. No. 731,949, May 24, 1968, abandoned.

[52] U.S. Cl. .................................99/107, 99/1, 99/100, 99/111
[51] Int. Cl. .................................A22c 21/00, A22c 25/00
[58] Field of Search...................99/1, 100, 100 P, 107, 111, 99/331, 404, 40 P, 443, 362

[56] References Cited

UNITED STATES PATENTS 2,853,937   9/1958   Peck..............................99/404

*Primary Examiner*—Hyman Lord
*Attorney*—Owen & Owen

[57] ABSTRACT

A method and apparatus for continuously pressure frying food items in an open, heated, generally U-shaped column of oil having a depth such that a pressure of not less than 2.5 p.s.i.g., and preferably at least 5 p.s.i.g., exists at the lower portion of the column. The food items are placed on a conveyor which moves continuously along a path leading from the surface of the oil downwardly to the bottom of the column of oil and back upwardly to the surface. Heated oil is added at predetermined points on the U-shaped oil column to maintain distinct thermal zones or thermal gradients in the oil column. The oil temperatures and the conveyor speed are selected such that each food item is properly cooked and browned when it is removed from the surface of the cooking oil.

10 Claims, 2 Drawing Figures

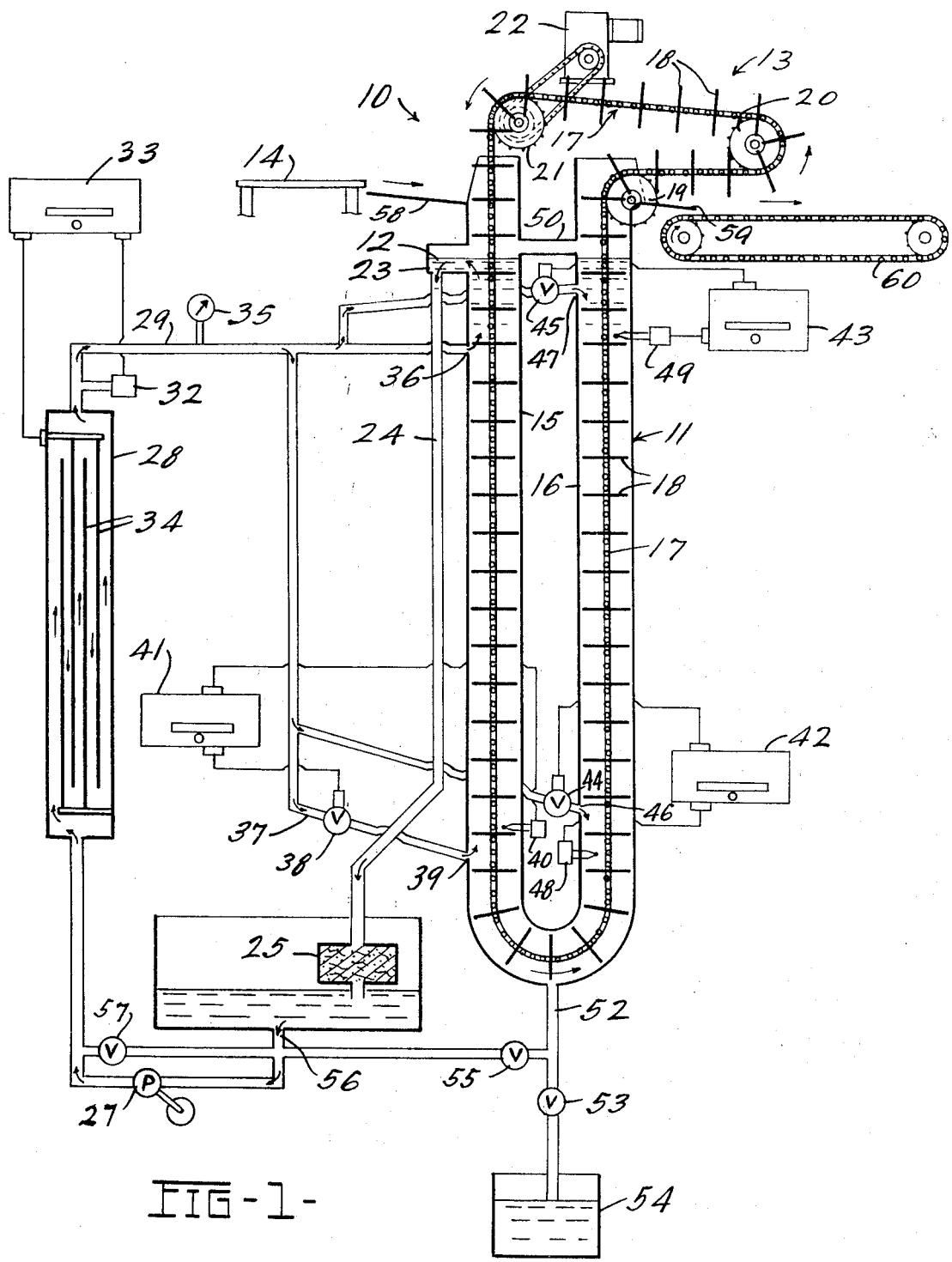
FIG-1-
INVENTOR:
WALTER F. KUHLMAN.

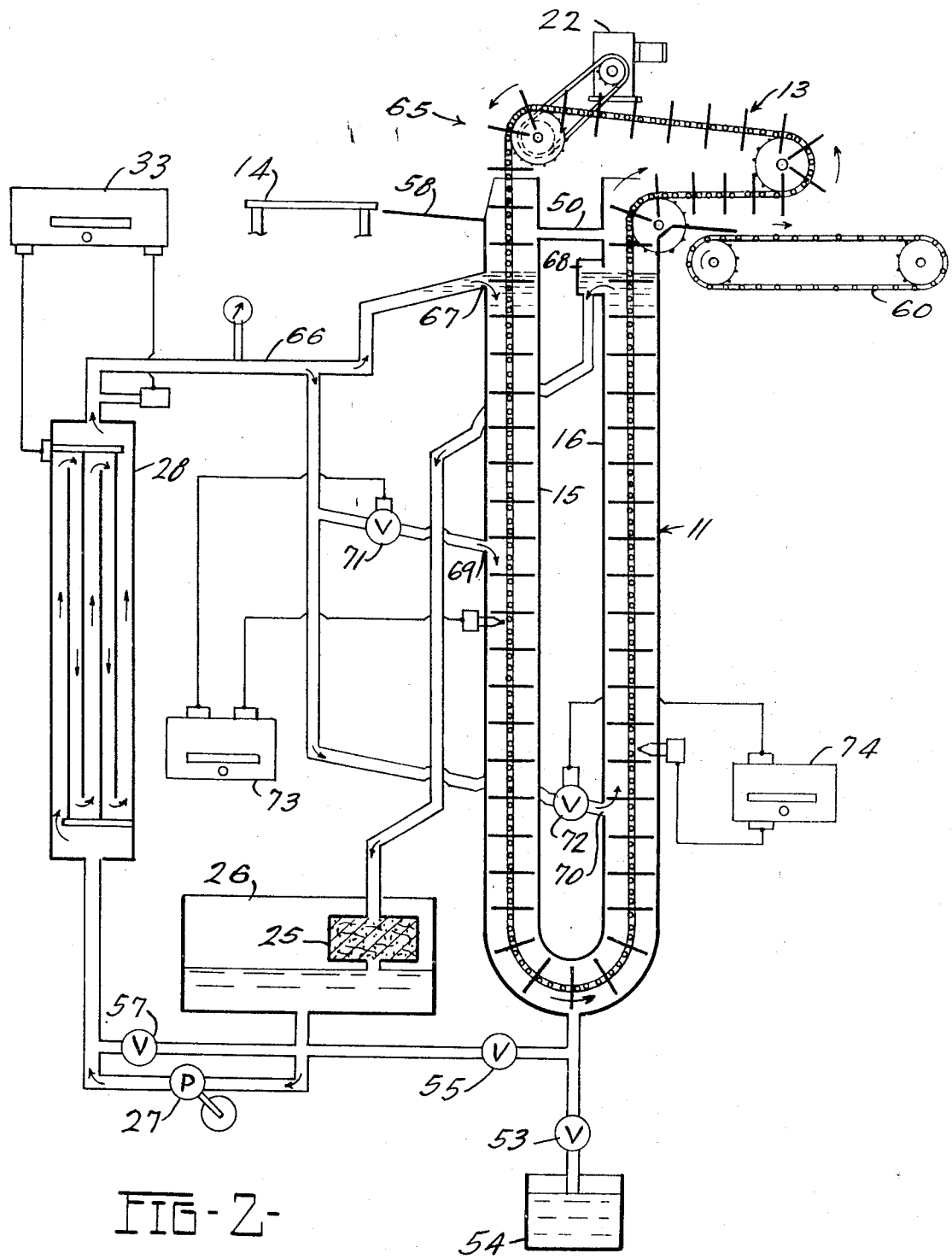

HYDROSTATIC FRYING METHOD

CROSS-REFERENCE TO RELATED APPLICATION

This is a continuation-in-part of my copending application Ser. No. 731,949, filed May 24, 1968, now abandoned.

BACKGROUND OF THE INVENTION

This invention relates generally to a process for frying food in deep fat and, more specifically, to an improved method and apparatus for continuously pressure-cooking chicken in hot cooking oil.

Ordinarily for commercial deep-fat-frying food items such as potatoes, fish and breaded chicken pieces, a large open pan is placed over a gas burner and is filled with cooking oil. When the oil is hot, the food to be fried is dropped into it by an attendant. The attendant then carefully watches the food until it is done and removes it from the pan. This method of frying food has several distinct disadvantages. An attendant must be on hand at all times to turn the food so that it will cook evenly and to remove the food when it is done. Most foods will float in the hot cooking oil. When food floats in the hot oil, the part extending above the oil surface will not cook properly and will tend to absorb oil, resulting in a poor quality food product. This type of open pan cooking is normally a batch process. A single batch of food is cooked until it is done and must be removed before the next batch can be cooked. If food pieces are introduced into the oil at different times, an additional burden is placed upon the attendant to remove the different pieces when each piece is cooked. This often results in undercooked or burnt food pieces. To clean the cooking oil, frying must normally be stopped while the oil is drained for filtering or replacing.

The above-described cooking process, commonly called french frying, is satisfactory for foods such as fish, potatoes and breads. However, it is unsatisfactory for cooking chicken because of the size and meat density of chicken pieces. If chicken pieces are french fried until they are cooked completely through, they will have a hard crust and the meat will be dry and of a generally poor quality. One solution to this problem has been to add an additional cooking step. If the chicken pieces are either parboiled before frying or baked subsequent to frying, they can be cooked without forming a hard crust or overly drying the meat. However, this procedure is time consuming and expensive when used on a commercial basis.

In a second process often used for frying food, and in particular chicken, the cooking oil is placed in a large pressure vessel and heated. Breaded chicken pieces, for example, are then dropped into the hot oil and, after they are seared and properly browned, the vessel is sealed. The temperature of the oil is lowered and the pressure within the vessel is allowed to build up as the chicken cooks. When the chicken pieces are completely cooked, the pressure is released and the pieces are removed from the vessel. This cooking process is also of the batch type. Once a batch is placed in the cooking vessel and the vessel is sealed, additional food pieces cannot be cooked until the first batch is done. In addition, it is difficult to drain and filter the oil from large pressure vessels. The batch pressure-frying process is described in greater detail in Sanders U.S. Pat. No. 3,245,800.

The prior art also teaches french frying food items by conveying the food items through a hot oil bath. Peck U.S. Pat. No. 2,853,937 is representative of the state of the prior art. The Peck patent is primarily concerned with completely submersing food items such as fish and potatoes in a uniformly hot cooking oil to evenly french fry the foods and is secondarily concerned with extending the useful life of the cooking oil. The prior art has not recognized the desirability of continuously moving food items through an elongated cooking container having cooking oil of a sufficient depth and maintained at controlled temperature zones and gradients sufficient to rapidly pressure cook, for example, large quantities of chicken pieces.

SUMMARY OF THE INVENTION

According to the present invention, a method and apparatus are provided for continuously pressure-frying foods, and in particular chicken pieces. The cooking apparatus comprises a generally U-shaped vessel or container which is filled with heated cooking oil to establish a U-shaped column of oil. The vessel is sufficiently large that the oil exerts a pressure of not less than 2.5 p.s.i.g., and preferably at least 5 p.s.i.g., at the lower portion of the column. A continuously operating conveyor is positioned in the U-shaped vessel. The conveyor is provided with a plurality of partitions defining a continuous series of compartments for carrying food through the hot cooking oil.

In operation, heated cooking oil is supplied to the vessel to maintain predetermined thermal zones and thermal gradients. The chicken pieces are coated with a layer of a conventional batter or breading material and are placed in a compartment on the side of the conveyor leading downwardly into the cooking vessel. As the chicken pieces enter the vessel, they are first submersed in oil which is sufficiently hot to sear and brown the skin and breading, thus sealing the natural juices in each chicken piece. The conveyor carries each piece downwardly into the U-shaped column of oil, exposing the chicken to increasing oil pressures. The increased pressure shortens the cooking time and further minimizes loss of natural juices from the chicken. The temperature in the U-shaped column of cooking oil and the speed of the conveyor are adjusted such that each piece of chicken will be fully cooked and properly browned when it is conveyed from the cooking vessel.

To maintain quality in the pressure-fried food items, the cooking oil is continuously circulated from the vessel through a filtering and heating system, and back to the vessel. If the oil is allowed to become contaminated or to deteriorate, the flavor of the cooked food will be adversely affected. Oil is circulated from adjacent the surface on one side of the vessel, through a filter and a heater and is returned to one or more points spaced around the vessel. In a preferred embodiment, the oil is removed from the surface on the side of the vessel in which the uncooked food is introduced. A relatively large quantity of clean heated oil is introduced at a point spaced a predetermined distance below the oil outlet to maintain a hot, constant temperature zone for searing and browning the chicken pieces. Additional controlled amounts of hot oil are delivered to the cooking vessel at predetermined points on the oil column to maintain desired temperature gradients between the sear zone and the exit point for the cooked chicken.

It is therefore the primary object of the present invention to provide an improved continuous process and apparatus for pressure frying food in heated cooking oil.

Another object of the present invention is to provide an improved apparatus for frying chicken pieces on a continuous basis.

Other objects and advantages of the invention will become apparent from the following detailed description of preferred forms thereof, reference being made to the accompanying drawings.

BRIEF DESCRIPTION OF THE DRAWINGS

FIG. 1 is a diagrammatic elevational view showing a preferred embodiment of the invention; and FIG. 2 is a diagrammatic elevational view of a modified embodiment of the invention.

DESCRIPTION OF THE PREFERRED EMBODIMENTS

Referring now to FIG. 1, apparatus 10 is shown diagrammatically in accordance with a preferred embodiment of the invention. The apparatus 10 generally comprises a vertical, U-shaped cooking vessel or container 11 which is filled with a hot cooking oil 12. The oil 12 is maintained at a sufficient depth as to exert a pressure of not less than 2.5 p.s.i.g., at the lower portion of the vessel 11, and preferably at least 5 p.s.i.g. If the oil depth is too small, the food cooked in the vessel 11 will not be pressure cooked and the temperatures of the oil 12 cannot be accurately controlled, thus resulting in a french frying process rather than a pressure-frying process. As previously stated, french frying is not suitable for some foods, particularly dense meats such as chicken. A cooking vessel having an oil depth of 11 feet, for example, has been found satisfactory for pressure frying chicken pieces. This depth will give a maximum oil pressure of between 4 and 5 p.s.i.g. at the bottom of the vessel 11.

An endless conveyor 13 is mounted within the U-shaped vessel 11 to extend from a work area 14 above the vessel 11 downwardly through a first vessel side 15 and upwardly through a second vessel side 16. The conveyor 13 comprises a pair of endless chains 17 mounted to ride in grooves or tracks (not shown) on opposite sides of the vessel 11 and a plurality of rigid, porous flights or partitions 18 attached between the two chains 17. The partitions 18 are spaced to define a continuous series of individual cooking compartments. Above the cooking vessel 11, the chains pass over a pair of idler wheels 19 and 20 and over a sprocket 21 which is driven at a constant speed by an electric motor 22.

A portion of the cooking oil 12 is not continuously removed from the vessel 11, filtered, heated, and returned to the vessel 11. The oil 12 is preferably removed at an outlet 23 positioned adjacent the oil surface in the first vessel side 15. The oil 12 flows by gravity through a pipe 24 and a filter 25 into a reservoir tank 26. A pump 27 forces a continuous flow of clean oil from the reservoir tank 26 through an electric heater 28 and a return pipe 29 back to the vessel 11. A temperature sensor 32 is positioned to monitor the oil temperature in the return pipe 29. The temperature sensor 32 is connected to a control unit 33 which controls power flow to a plurality of electrically heated baffles 34 in the heater 28. The clean oil passing through the heater 28 comes into intimate contact with the baffles 34 for maximum heat transfer to the oil. The control unit 33 is of a conventional, commercially available type and may, for example, use silicon-controlled rectifiers to control power to the baffles 34. A pressure gauge 35 may be connected to the return pipe 29. The pressure gauge 35 gives a direct indication of the oil pressure in the pipe 29 and, indirectly, an indication of the oil flow rate in the pipe 29, which is proportional to the pressure.

The oil in the return pipe 29 is at a predetermined hot temperature for searing the food items cooked in the vessel 11. This temperature is preset or programmed into the control unit 33. The pipe 29 is connected to deliver the hot oil at a point 36 spaced a predetermined distance below the oil surface in the first vessel side 15. The entering oil 12 flows upwardly, against the movement of the conveyor 13, to the outlet 23. The oil flow is at a sufficient rate to maintain a substantially constant hot-temperature zone in the vessel 11 for searing and browning food items entering the vessel 11.

Hot, clean oil in the pipe 29 is also returned to additional points spaced around the vessel 11. However, the rate of oil flow entering at each additional point is accurately controlled to establish predetermined temperature gradients in the vessel 11. A portion of the clean oil flows from the pipe 29 through a pipe 37 and a control valve 38 to a point 39 on the vessel 11. Oil entering the vessel at the point 39 flows upwardly past a temperature sensor 40 to the outlet 23. A control unit 41 is responsive to the temperature at the sensor 40 to open and close the valve 38 to maintain a predetermined oil temperature between the points 39 and 36. Similarly, control units 42 and 43 operate to open and close valves 44 and 45, respectively, to control the delivery of hot oil at points 46 and 47, respectively, on the vessel 11. The control unit 42 is responsive to a temperature sensor 48 downstream of the point 46, while the control unit 43 is responsive to a temperature sensor 49 downstream of the point 47. The oil return point 47 is located adjacent the oil surface on the second vessel side 16. Hence, the oil 12 in the vessel 11 moves in a direction from the oil surface on the second vessel side 16 to the oil surface on the first vessel side 15, counter to the direction of movement of the conveyor 13. By providing an oil flow in this direction, the possibility of a temperature stratification is eliminated. It will be appreciated that although FIG. 1 shows four oil return points 36, 39, 46, and 47, the oil may be returned at fewer than or more than four points. An oil overflow pipe 50 is positioned to connect the first and second vessel sides 15 and 16 above the normal surface level of the oil 12. In the event that the vessel 11 becomes plugged, oil will pass through the overflow pipe 50 to the outlet 23. A safety switch (not shown) can also be connected to shut off the pump 27 if the oil level should rise too high in either vessel side 15 or 16.

The bottom of the vessel 11 is connected through a drain pipe 52 and a valve 53 to a storage drum 54. The pipe 52 is also connected through a valve 55 to the outlet 56 of the reservoir tank 26 and a bypass valve 57 is connected in parallel with the pump 27. Opening the three valves 53, 55 and 57 will cause the oil 12 to drain into the drum 54 from the vessel 11, the reservoir tank 26, the heater 28, and the interconnecting pipes. Thus, the apparatus 10 can be easily drained for cleaning the vessel 11 and for replacing the oil 12.

The apparatus 10 is also provided with a chute 58 for directing food from the work area 14 into the compartments on the conveyor 13. Similarly, food conveyed from the vessel 11 falls down a chute 59 onto a foraminous conveyor 60. Oil drains from the cooked food through the conveyor 60 as it is conveyed to an area where it is placed, for example, in carry out packages, on plates for serving to customers, in a warmer for temporary storage, or in commercial packages.

EXAMPLE

An 11 foot high cooking vessel 11 was constructed and tested for cooking chicken pieces in large quantities. The vessel was filled with cooking oil to establish a U-shaped column of oil and the oil was brought up to predetermined temperatures. For cooking the chicken pieces it was found that heating the oil to 360° F. was satisfactory. An oil flow on the order of 20 gallons per minute was delivered to the point 36 on the vessel 11 for maintaining a constant 360° F. searing and browning zone at the upper part of the first vessel side 15. The control unit 41 was set to control oil flow through the valve 38 for maintaining the oil downstream of the point 39 at 295° F. Similarly, the control unit 42 was set to control oil flow through the valve 44 for maintaining a 270° F. temperature downstream of the point 46, and the control unit 43 was set to control oil flow through the valve 45 for maintaining a 250° F. temperature downstream of the point 47. The motor 22 operated the conveyor at a speed such that the chicken pieces were cooked in about 18 minutes. An attendant was positioned at the work area 14 to coat the chicken pieces with a suitable breading material, such as a dry flour and spice mixture or a liquid batter. The attendant fed the breaded pieces down the chute 58 into compartments on the conveyor 13. The chicken pieces are then conveyed through the U-shaped column of oil in the vessel 11, where they are first seared and browned and then pressure fried. Upon leaving the second side 16 of the vessel 11, the cooked chicken pieces were drained and conveyed on the conveyor 60 to a consumption area. The apparatus 10 was capable of cooking 1,100 chicken pieces per hour with a consistent high quality.

Referring now to FIG. 2, a modified embodiment of the continuous pressure-frying apparatus is generally designated by the reference number 65. The cooking apparatus 65 differs from the apparatus 10 in FIG. 1 only in the direction of oil flow in the U-shaped vessel 11. In the modified embodiment, oil flows through the vessel 11 in the same direction as the conveyor 13 is driven by the motor 22. A main flow of oil passes from the heater 28 through a pipe 66 and enters the vessel 11 at point 67 adjacent the oil surface in the first vessel side 15. The oil flows through the vessel 11 and is removed for filtering and heating at an outlet 68 adjacent the oil surface in the second side 16. Additional hot filtered oil flows into the vessel 11 at points 69 and 70. The rate of flow at these points is controlled by values 71 and 72 and associated control units 73 and 74. The overflow pipe 50 connects the first and second sides 15 and 16 above the normal oil level as a safety factor in case the vessel 11 becomes plugged.

Since the rate of oil flow in the searing and browning zone in the upper portion of the first vessel side 15 is not as large as in the embodiment of FIG. 1, it is necessary to adjust the control unit 33 such that the oil is heated to a higher temperature, for example, to 400° F. The oil will rapidly cool as cool food items are conveyed through the searing and browning zone. The control units 73 and 74 open the valves 71 and 72, respectively, to add sufficient amounts of hot oil to maintain the oil in the vessel at the desired preselected temperatures. Unlike the apparatus 10 of FIG. 1, care must be taken in constructing and operating the modified apparatus 65 to prevent temperature stratification of the oil. Temperature stratification and the higher oil temperature can, however, result in poorly cooked foods and can lead to a premature deterioration of the cooking oil.

It will be appreciated that various other arrangements embodying the process and apparatus of this invention may be used without departing from the spirit and the scope of the appended claims.

What I claim is:

1. A method for pressure-frying food items in heated cooking oil comprising the steps of:
    a. establishing a U-shaped column of cooking oil having a depth such that an oil pressure of not less than 2.5 p.s.i.g. exists at the lower portion of said column, said column having inlet and outlet sides;
    b. maintaining said oil above a predetermined hot searing temperature in an upper portion of said inlet side and at predetermined cooler cooking temperatures in the remainder of said column;
    c. serially moving the food items into the upper portion of said inlet side of said column of heated oil and therethrough along a path leading downwardly to the bottom thereof and upwardly to the top of said outlet side of said column at a controlled rate of movement such that each food item is immersed in such hot oil for a predetermined period of time; and
    d. removing each food item from the cooking oil after it reaches the upper surface thereof.

2. A method for pressure-frying food items in heated cooking oil, as defined in claim 1, wherein the remainder of said column is maintained at a plurality of thermal zones gradually decreasing in temperature from the predetermined hot searing temperature in the upper portion of said inlet side to a predetermined cooler temperature at the upper portion of said outlet side.

3. A method for pressure frying food items in heated cooking oil, as defined in claim 1, and further including the steps of removing cooking oil from adjacent the upper surface of said inlet side, heating such removed oil to above said predetermined hot temperature, circulating sufficient heated oil through the upper portion of said inlet side to maintain such upper portion above said predetermined hot temperature, and adding sufficient amounts of said heated oil at predetermined points on said column to maintain the remainder of said column at said predetermined cooler cooking temperatures.

4. A method for pressure frying food items in heated cooking oil, as defined in claim 3, and further including the step of filtering the removed cooking oil.

5. A method for pressure-frying chicken pieces in heated cooking oil comprising the steps of:
    a. establishing a U-shaped column of cooking oil having a depth such that an oil pressure of not less than 2.5 p.s.i.g. exists at the lower portion of said column, said column having inlet and outlet sides;
    b. maintaining the oil in said column in at least two predetermined thermal zones, a first thermal zone at the upper portion of the inlet side above a predetermined hot temperature for searing and browning and a second zone below said predetermined hot temperature for cooking;
    c. coating the chicken pieces with a layer of breading material;
    d. serially moving the breaded chicken pieces into the upper portion of the inlet side of said column of heated oil and therethrough along a path leading downwardly to the bottom thereof and upwardly to the top of the outlet side of said column at a controlled rate of movement such that each chicken piece is immersed in hot oil for a predetermined period of time; and
    e. removing each chicken piece from the cooking oil after it reaches the upper surface of the outlet side.

6. A method of pressure-frying chicken pieces in heated cooking oil, as defined in claim 5, wherein the temperature of the oil is maintained by removing oil from adjacent the upper surface of said inlet side, heating the removed oil to above said predetermined hot temperature, flowing sufficient heated oil through the first thermal zone at the upper portion of the inlet side to maintain said zone above said predetermined hot temperature for searing the breaded chicken pieces, and adding sufficient heated oil at predetermined points on the remainder of said column to maintain a predetermined temperature gradient in the second zone in said column.

7. A method of pressure-frying chicken pieces in heated cooking oil, as defined in claim 6, and including the step of filtering the removed oil.

8. A method of pressure-frying chicken pieces in heated cooking oil, as defined in claim 5, and additionally including the step of continuously recirculating oil from an upper surface of said column through an oil filter and back to a plurality of points on said column.

9. A method of pressure-frying chicken pieces in heated cooking oil, as defined in claim 5, wherein said U-shaped column of oil is established to a depth such that an oil pressure of not less than 5 p.s.i.g. exists at the lower portion of said column.

10. A method for pressure-frying chicken pieces in heated cooking oil, said method comprising the steps of:
    a. filling a generally U-shaped vessel with cooking oil to a depth such that an oil pressure of not less than 5 p.s.i.g. exists at the lower portion of the vessel, said vessel having inlet and outlet sides;
    b. maintaining the oil in an upper zone in the inlet side at a predetermined hot temperature and maintaining a predetermined thermal gradient in the remaining oil in the vessel;
    c. coating chicken pieces with a layer of breading material;
    d. serially conveying the breaded chicken pieces into the hot oil in the upper zone of the inlet side of the vessel and along a path leading downwardly through the heated oil in the inlet side and then upwardly through the heated oil in the outlet side of the vessel;
    e. controlling the rate of movement of the chicken pieces through the vessel such that each piece of chicken is fully cooked and browned when it reaches the oil surface on the outlet side of the vessel;
    f. removing each cooked chicken piece from the cooking oil when it reaches the oil surface on the outlet side of the vessel; and
    g. circulating a portion of said cooking oil from the vessel through a filter and returning it to the vessel.

* * * * *